United States Patent
Hu et al.

(10) Patent No.: US 11,113,492 B2
(45) Date of Patent: Sep. 7, 2021

(54) METHOD FOR DETERMINING IMAGING RATIO OF CURVED DISPLAY, STORAGE MEDIUM AND ELECTRONIC DEVICE

(71) Applicant: Shanghai Harvest Intelligence Technology Co., Ltd., Shanghai (CN)

(72) Inventors: Xueke Hu, Shanghai (CN); Tianyang Wang, Shanghai (CN); Fei Wang, Shanghai (CN); Sheng Feng, Shanghai (CN); Fengjun Gu, Shanghai (CN); Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 23 days.

(21) Appl. No.: 16/702,244

(22) Filed: Dec. 3, 2019

(65) Prior Publication Data
US 2020/0175661 A1 Jun. 4, 2020

(30) Foreign Application Priority Data
Dec. 4, 2018 (CN) .......................... 201811476457.4

(51) Int. Cl.
| | |
|---|---|
| *G06K 9/00* | (2006.01) |
| *G06T 5/00* | (2006.01) |
| *G06T 3/40* | (2006.01) |
| *G06T 1/20* | (2006.01) |
| *H04M 1/02* | (2006.01) |
| *G06T 1/00* | (2006.01) |

(52) U.S. Cl.
CPC .............. *G06K 9/00* (2013.01); *G06T 1/0007* (2013.01); *G06T 1/20* (2013.01); *G06T 3/40* (2013.01); *G06T 5/009* (2013.01); *H04M 1/0268* (2013.01)

(58) Field of Classification Search
CPC .. G06T 5/009; G06T 3/40; G06T 1/20; G06T 1/0007; H04M 1/0268; H04M 1/72403; H04M 1/0266; G06K 9/0004; G06K 9/00
See application file for complete search history.

(56) References Cited

U.S. PATENT DOCUMENTS

| | | | | |
|---|---|---|---|---|
| 4,924,085 A | * | 5/1990 | Kato ..................... | A61B 5/1172 250/227.28 |
| 5,528,355 A | * | 6/1996 | Maase ................ | G06K 9/00046 356/71 |
| 10,839,193 B1 | * | 11/2020 | Chen ...................... | G06K 9/209 |

(Continued)

*Primary Examiner* — Premal R Patel
(74) *Attorney, Agent, or Firm* — Harness, Dickey & Pierce, P.L.C.

(57) ABSTRACT

A method for determining an imaging ratio of a curved panel is provided, wherein a first surface of the curved panel is placed with a to-be-imaged object thereon, an image capturing device is disposed on a second surface opposite to the first surface in a thickness direction of the curved panel, the image capturing device is configured to capture an image of the to-be-imaged object being imaged by the curved panel, and the method comprises: obtaining a thickness of the curved panel and a curvature radius of the first surface of the curved panel; and calculating the imaging ratio of the curved panel for the to-be-imaged object according to the obtained thickness and curvature radius. Therefore, the captured image is corrected according to the imaging ratio, thereby capturing an image that is close to an actual size of the to-be-imaged object.

20 Claims, 3 Drawing Sheets

(56) References Cited

U.S. PATENT DOCUMENTS

| | | | |
|---|---|---|---|
| 2003/0063783 A1* | 4/2003 | Higuchi | G06K 9/00046 |
| | | | 382/125 |
| 2011/0286641 A1* | 11/2011 | Schneider | G06K 9/00046 |
| | | | 382/124 |
| 2017/0372152 A1* | 12/2017 | Baek | G06K 9/00885 |
| 2019/0073001 A1* | 3/2019 | Kim | G02F 1/133308 |
| 2019/0163953 A1* | 5/2019 | Jin | G06K 9/00046 |

\* cited by examiner

METHOD FOR DETERMINING IMAGING RATIO OF CURVED DISPLAY, STORAGE MEDIUM AND ELECTRONIC DEVICE

CROSS-REFERENCE TO RELATED APPLICATIONS

This application claims the benefit of priority to Chinese Patent Application No. 201811476457.4, filed on Dec. 4, 2018, and entitled "METHOD FOR DETERMINING IMAGING RATIO OF CURVED PANEL, STORAGE MEDIUM AND ELECTRONIC DEVICE". The entire contents of this application are incorporated herein by reference.

TECHNICAL FIELD

The present disclosure relates to image processing technologies, and more particularly, to a method for determining an imaging ratio of a curved panel, a storage medium, and an electronic device.

BACKGROUND

With the development of information technology, people are increasingly dependent on electronic products. In recent years, people not only pursue enrichment and perfection of functions of the electronic products, but also gradually begin to pursue a comfortable user experience of electronic products. As an emerging technology, curved panels quickly attract a wide development on major electronic products, for example, popular TVs and mobile phones with curved panels on the market, which are gradually changing a visual sense and experience of consumers based on conventional electronic products with flat panels.

From conventional flat panels to curved panels, there is a need to change the previous image processing technology to match imaging characteristics of curved panels.

SUMMARY

During an imaging process of a curved panel, an captured image of a to-be-imaged object itself is scaled with a certain degree with respect to the to-be-imaged object itself, and a size of the captured image is not equal to an actual size of the to-be-imaged object. To solve the problem, embodiments of the disclosure provide a method for determining an imaging ratio of a curved panel, wherein a first surface of the curved panel is placed with a to-be-imaged object thereon, an image capturing device is disposed on a second surface opposite to the first surface in a thickness direction of the curved panel, the image capturing device is configured to capture an image of the to-be-imaged object being imaged by the curved panel, and the method includes: obtaining a thickness of the curved panel and a curvature radius of the first surface of the curved panel; and calculating the imaging ratio of the curved panel for the to-be-imaged object according to the obtained thickness and curvature radius.

In some embodiments, obtaining the thickness of the curved panel and the curvature radius of the first surface of the curved panel includes: dividing the first surface of the curved panel into a plurality of regions; and determining a region where the to-be-imaged object locates on the first surface of the curved panel, and obtaining a thickness and a curvature radius of the curved panel in the region.

In some embodiments, the first surface of the curved panel is configured for a finger contact, and a photoelectric sensing module is disposed on the second surface of the curved panel; and a light source is disposed close to the second surface inside the curved panel, wherein the light source is configured to emit light signals toward different directions of the first surface of the curved panel, the light signals are reflected on the first surface of the curved panel to form reflection light in different directions, and the reflection light passes through the curved panel and enters the photoelectric sensing module.

In some embodiments, the first surface of the curved panel is a convex surface, and the second surface of the curved panel is a concave surface, and calculating the imaging ratio of the curved panel for the to-be-imaged object according to the obtained thickness and curvature radius includes: calculating the imaging ratio of the curved panel according to $k=2(r-h)/r$, wherein k is a scaling factor of a fingerprint image captured by the photoelectric sensing module with respect to an original fingerprint, r is a curvature radius of the first surface of the curved panel in a region where the fingerprint locates, h is a thickness of the curved panel in the region where the fingerprint locates, wherein k, r, h are all non-negative numbers.

In some embodiments, the scaling factor of the fingerprint image captured by the photoelectric sensing module with respect to the original fingerprint is $0<k<2$.

In some embodiments, the first surface of the curved panel is a concave surface, and the second surface of the curved panel is a convex surface, and calculating the imaging ratio of the curved panel for the to-be-imaged object according to the obtained thickness and curvature radius includes: calculating an imaging ratio of the curved panel according to $k=2r/(r-h)$, wherein k is a scaling factor of a fingerprint image captured by the photoelectric sensing module with respect to an original fingerprint, r is a curvature radius of the first surface of the curved panel in a region where the fingerprint locates, h is a thickness of the curved panel in the region where the fingerprint locates, wherein k, r, h are all non-negative numbers.

In some embodiments, the scaling factor of the fingerprint image captured by the photoelectric sensing module with respect to the original fingerprint is $0<k<2$.

In some embodiments, the curved panel includes: a light-transmissive cover plate, including the first surface configured for the finger contact; and a display panel, with a first surface configured with the light-transmissive cover plate thereon and the second surface configured with the photoelectric sensing module thereon, wherein a plurality of display pixels are disposed close to the second surface and inside the display panel, and the light source includes one display pixel or multiple display pixels.

Embodiments of the present disclosure further provide a non-transitory storage medium, storing computer programs, wherein once the computer programs are executed by a process, the method for determining an imaging ratio of a curved panel is performed.

Embodiments of the present disclosure further provide an electronic device, including: a curved panel, an image capturing device, a memory, and a processor; wherein the curved panel includes a first surface configured to be placed with a to-be-imaged object, and the image capturing device is disposed on a second surface of the curved panel opposite to the first surface in a thickness direction of the curved panel; the image capturing device is configured to capture an image of the to-be-imaged object being imaged by the curved panel; the processor is coupled with the curved panel and the image capturing device; and the memory storing computer programs, wherein once the computer programs are executed by the processor, the method for determining an imaging ratio of a curved panel is performed.

In some embodiments, when the computer programs are executed by the processor, a method for correcting an image captured by the image capturing device according to the imaging ratio of the curved panel is also performed In some embodiments, the memory further stores a thickness and a curvature radius of the curved panel.

In some embodiments, the electronic device is made of a flexible material and suitable to be worn on a wrist or other parts of a body.

In some embodiments, the electronic device includes a mobile phone, a smart bracelet, or a wristwatch.

Embodiments of the present disclosure have following benefits.

In the method for determining the imaging ratio of the curved panel according to embodiments of the disclosure, the imaging ratio of the curved panel for the to-be-imaged object can be calculated according to the curvature radius and the thickness of the curved panel, so as to correct the captured image according to the imaging ratio, thereby capturing an image that is close to an actual size of the to-be-imaged object.

Further, the curved panel may include heterogeneous thicknesses and curvature radii. The method further includes: dividing the first surface of the curved panel into a plurality of regions to obtain a thickness and a curvature radius of each region of the curved panel; and determining a region where the to-be-imaged object locates on. Therefore, the imaging ratio of the curved panel for the to-be-imaged object can be calculated according to the curvature radius and the thickness of the curved panel in the determined region, and the accuracy of the calculation result is improved.

Further, the curved panel can perform an imaging based on a total reflection principle of physical optics. According to different bending directions of the curved panel, different calculation methods can be applied to calculate the imaging ratio of the curved panel. Specifically, when the curved panel is applied to an in-display or under-display fingerprint recognition, if the finger is in contact with the convex surface of the curved panel, the imaging ratio of the curved panel may be calculated according to $k=2(r-h)/r$, the imaging ratio may be greater than 1 (i.e., a magnified image), or may be less than 1 (i.e., a reduced image); if the finger is in contact with the concave surface of the curved panel, the imaging ratio of the curved panel may be calculated according to $k=2r/(r-h)$, wherein the imaging ratio is greater than 2 (i.e., a magnified image).

Embodiments of the present disclosure further provide an electronic device, which includes a curved panel, an image capturing device, a memory, and a processor, once the computer programs stored in the memory are executed by the processor, a method for determining an imaging ratio of a curved panel is performed. Therefore, the electronic device can improve the wearing comfort of the electronic product with the curved panel, and can also correct the captured image according to the determined imaging ratio of the curved panel, thereby capturing an image that is close to an actual size of the to-be-imaged object.

Further, the electronic device is made of a flexible material which is suitable for being worn on a wrist or other parts of a body, and the electronic device may include a mobile phone, a smart bracelet, or a wristwatch, which enriches application scenarios of electronic devices with curved panels.

DETAILED DESCRIPTION

In order that the above objects, characteristics and advantages of the present disclosure become more apparent, and embodiments of the present disclosure are described in detail with reference to the drawings. Embodiments in the specification are described in a progressive manner, and each embodiment focuses on differences from other embodiments, and the same or similar parts between the embodiments may be referred to each other.

Figure 1:
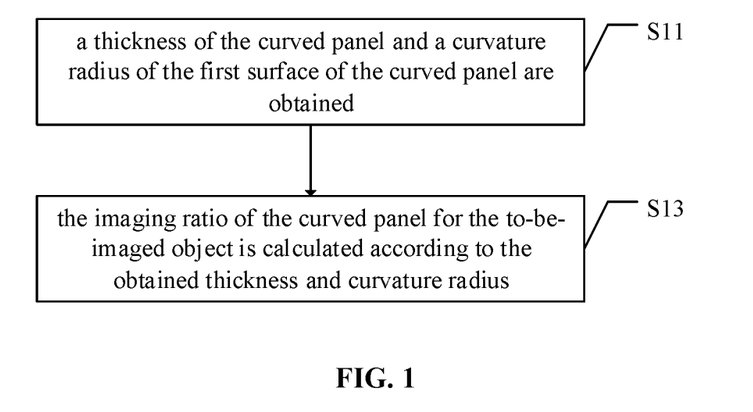
FIG. 1 schematically illustrates a flow diagram of a method for determining an imaging ratio of a curved panel according to an embodiment of the present disclosure.

Referring to FIG. 1, FIG. 1 schematically illustrates a flow diagram of a method for determining an imaging ratio of a curved panel according to an embodiment of the present disclosure. In some embodiments, a first surface of the curved panel is placed with a to-be-imaged object thereon, an image capturing device is disposed on a second surface of the curved panel opposite to the first surface in a thickness direction of the curved panel, the image capturing device is configured to capture an image of the to-be-imaged object being imaged by the curved panel, and the method for determining the imaging ratio of the curved panel includes S11 and S13.

In S11, a thickness of the curved panel and a curvature radius of the first surface of the curved panel are obtained.

In S13, the imaging ratio of the curved panel for the to-be-imaged object is calculated according to the obtained thickness and curvature radius.

In some embodiments, the curved panel can perform an imaging based on a total reflection principle of physical optics. For example, when the curved panel is applied to an in-display or under-display fingerprint recognition, the first surface of the curved panel may be configured for a finger contact, a photoelectric sensing module is disposed on the second surface of the curved panel, and a light source is disposed close to the second surface inside the curved panel, wherein the light source is configured to emit light signals toward different directions of the first surface of the curved panel, the light signals are totally reflected on the first surface of the curved panel to form total reflection light in different directions, and the total reflection light passes through the curved panel and enters the photoelectric sensing module. Since an intensity of the totally reflection light is modulated by the fingerprint topography, an image of the fingerprint can be obtained by capturing the total reflection light emitted from the second surface of the curved panel.

In some embodiments, the curved panel has a uniform thickness and a uniform curvature radius at each point, and S11 further includes: obtaining the thickness and the curvature radius of the curved panel at any points.

In some embodiments, the curved panel has different thicknesses and curvature radii at each point, and S11 further includes: obtaining a thickness of the curved panel at a point of the to-be-imaged object, and a curvature radius of the curved panel at a point of the to-be-imaged object on the first surface.

In some embodiments, the thickness and curvature radius of the curved panel at each point may be stored in a memory in advance, and when the method for determining imaging ratio of the curved panel is performed by a computer program, the thickness and curvature radius of the curved panel at each point stored in a memory are directly called.

Figure 2:
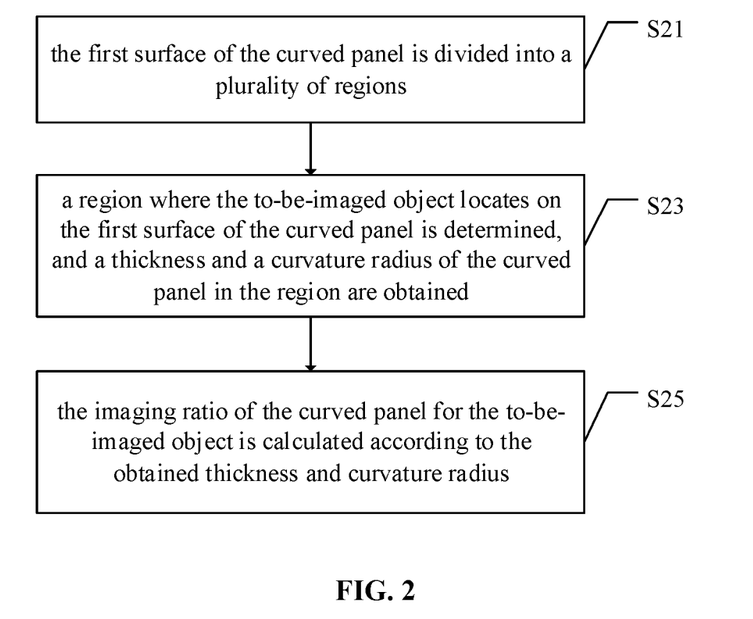
FIG. 2 schematically illustrates a flow diagram of a method for determining an imaging ratio of a curved panel according to an embodiment of the present disclosure.

FIG. 2 schematically illustrates a flow diagram of a method for determining an imaging ratio of a curved panel according to an embodiment of the present disclosure. The method for determining the imaging ratio of the curved panel may include following steps.

In S21, the first surface of the curved panel is divided into a plurality of regions.

In S23, a region where the to-be-imaged object locates on the first surface of the curved panel is determined, and a thickness and a curvature radius of the curved panel in the region are obtained.

In S25, the imaging ratio of the curved panel for the to-be-imaged object is calculated according to the obtained thickness and curvature radius.

In some embodiments, the method for determining the imaging ratio of the curved panel is applicable to a case where the curved panel has different thicknesses and curvature radii at each point or each region. At this case, the curved panel can be partitioned.

In some embodiments, the thicknesses and curvature radii of the curved panel in regions may be stored in a memory in advance, and when the method for determining imaging ratio of the curved panel is performed by a computer program, the thicknesses and curvature radii of the curved panel in regions determined in S23 and stored in a memory are directly called.

The calculating methods in S13 and S25 are described in detail below.

Figure 3:
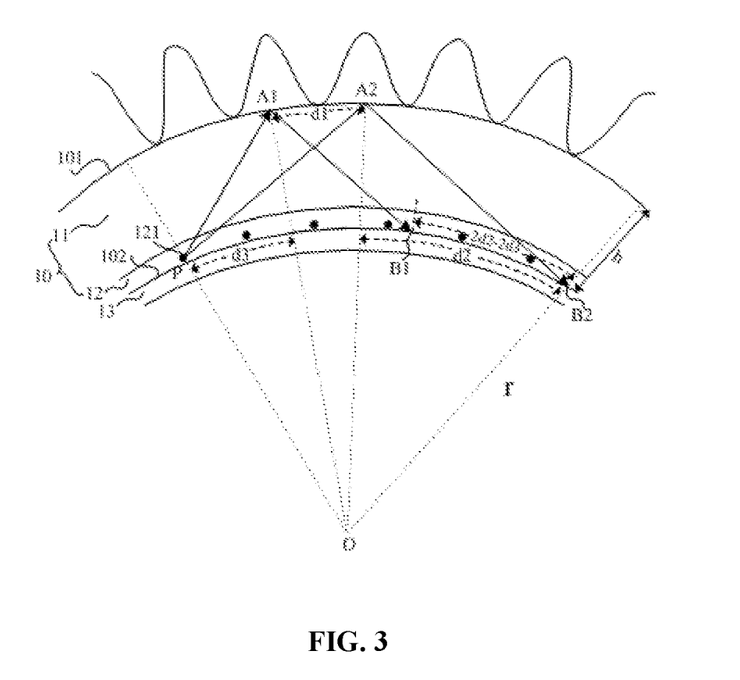
FIG. 3 schematically illustrates a diagram of an imaging optical path of a curved panel 10 according to an embodiment of the present disclosure.

FIG. 3 schematically illustrates a diagram of an imaging optical path of a curved panel 10 according to an embodiment of the present disclosure.

In some embodiments, a first surface 101 of the curved panel 10 is a convex surface, a second surface 102 of the curved panel is a concave surface, the first surface 101 is configured for a finger contact, a photoelectric sensing module 13 is disposed on the second surface 102, and a light source 121 is disposed close to the second surface 102 inside the curved panel 10.

In some embodiments, the curved panel 10 includes: a light-transmissive cover plate 11, wherein the light-transmissive cover plate 11 has a first surface configured for the finger contact; and a display panel 12, with a first surface configured with the light-transmissive cover plate 11 thereon and the second surface configured with the photoelectric sensing module 13 thereon, wherein a plurality of display pixels are disposed close to the second surface and inside the display panel 12, and the light source 121 may include one display pixel or multiple display pixels.

In some embodiments, the curved panel 10 may have a uniform thickness h and a curvature radius r in a region where the fingerprint locates, where the thickness h may be the a sum of a thickness of the light-transmissive cover plate 11 and a thickness of the display panel 12, and the curvature radius r is a curvature radius of the first surface 101 in the region where the fingerprint locates. Therefore, calculating an imaging ratio of the curved panel 10 for a fingerprint according to the curvature radius r and the thickness h of the curved panel 10 in the region where the fingerprint locates includes: calculating a scaling factor k of a fingerprint image obtained by the photoelectric sensing module 13 with respect to an original fingerprint according to a formula $k=2(r-h)/r$, wherein k, r, and h are non-negative numbers.

A derivation process for the formula $k=2(r-h)/r$ is shown as follows: in FIG. 3, the light source 121 near the second surface 102 of the curved panel 10 emits light rays PA1 and PA2 to different directions of the first surface 101 of the curved panel 10, and the two light rays PA1 and PA2 performs a total reflection at an interface between two adjacent concave lines and the first surface 101 respectively. Total reflection rays A1B1 and A2B2 pass through the second surface 102 of the curved panel 10 and enter the photoelectric sensing module 13. An actual distance between two adjacent concave lines may be expressed approximately by an arc length d1 of the first surface 101 of the curved panel 10 between the two points A1 and A2, and the distance between the two adjacent concave lines in the fingerprint image captured by the photoelectric sensing module 13 may be expressed approximately by an arc length $2d2-2d3$ of the second surface 102 of the curved panel 10 between the two light-exiting points B1 and B2, wherein d3 is an arc length of the second surface 102 of the curved panel 10 between the light-emitting point P of the light source 121 and a normal OA1, and d2 is an arc length of the second surface 102 of the curved panel 10 between the light-emitting point P of the light source 121 and a normal OA2. Therefore, a ratio of a distance between two adjacent concave lines in the image captured by the photoelectric sensing module 13 to the actual distance between two adjacent concave lines, that is, the imaging ratio of the curved panel 10 to the fingerprint, is $k=(2d2-2d3)/d1=2(r-h)/r$.

In some embodiments, the scaling factor of the fingerprint image captured by the photoelectric sensing module 13 with respect to the original fingerprint is $0<k<2$. When the imaging scaling factor k of the curved panel 10 is greater than 1, the captured image is a magnified image of the fingerprint; and when the imaging scaling factor k of the curved panel 10 is less than 1, the captured image is a reduced image of the fingerprint. Specifically, when $r>2h$, $1<k<2$; and when $h<r<2h$, $0<k<1$.

When the curvature radius r of the curved panel 10 approaches positive infinity, that is, when the curved panel 10 is a flat panel, the imaging ratio is equal to two.

Figure 4:
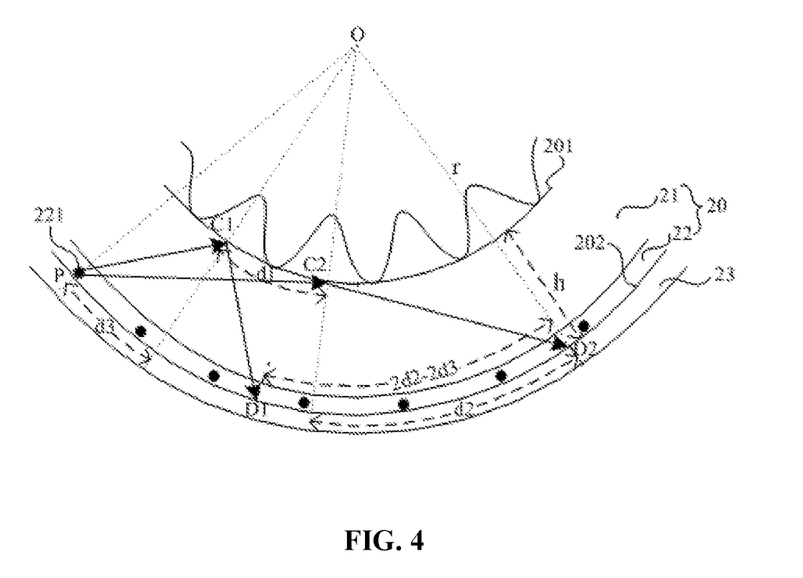
FIG. 4 schematically illustrates a diagram of an imaging optical path of a curved panel 20 according to an embodiment of the present disclosure.

Referring to FIG. 4, FIG. 4 schematically illustrates a diagram of an imaging optical path of a curved panel 20 according to an embodiment of the present disclosure.

In some embodiments, a first surface 201 of the curved panel 20 is a concave surface, a second surface 202 of the curved panel is a convex surface, the first surface 201 is configured for the finger contact, a photoelectric sensing module 23 is disposed on the second surface 202, and a light source 221 is disposed close to the second surface 202 inside the curved panel 20.

In some embodiments, the curved panel 20 may include: a light-transmissive cover plate 21, wherein the light-transmissive cover plate 21 has a first surface configured for the finger contact; and a display panel 22, with a first surface configured with the light-transmissive cover plate 21 thereon and the second surface configured with the photoelectric sensing module 23 thereon, wherein a plurality of display pixels are disposed close to the second surface and inside the display panel 22, and the light source 221 may include one display pixel or multiple display pixels.

In some embodiments, the curved panel 20 may have a uniform thickness h and a curvature radius r in a fingerprint pressing region, where the thickness h may be the a sum of a thickness of the light-transmissive cover plate 21 and a thickness of the display panel 22, and the curvature radius r is a curvature radius of the first surface 201 in the region where the fingerprint locates. Therefore, calculating an imaging ratio of the curved panel 20 for a fingerprint according to the curvature radius r and the thickness h of the curved panel 20 in the region where the fingerprint locates includes: calculating a scaling factor k of a fingerprint image captured by the photoelectric sensing module 23 with respect to an original fingerprint according to a formula $k=2r/(r-h)$, wherein k, r, and h are non-negative numbers.

A derivation process for the formula $k=2(r-h)/r$ is shown as follows: in FIG. 4, the light source 221 near the second surface 202 of the curved panel 10 emits light rays PC1 and PC2 toward different directions of the first surface 201 of the curved panel 10, and the two light rays PC1 and PC2 performs a total reflection at an interface between two adjacent concave lines and the first surface 201 respectively. Total reflection rays C1D1 and C2D2 pass through the second surface 202 of the curved panel 20 and enter the photoelectric sensing module 23. An actual distance between two adjacent concave lines may be expressed approximately by an arc length d1 between the two points C1 and C2 on the first surface 201 of the curved panel 20, and the distance between the two adjacent concave lines in the fingerprint image captured by the photoelectric sensing module 23 may be expressed approximately by an arc length $2d2-2d3$ between the two light-exiting points D1 and D2 on the second surface 202 of the curved panel 20, wherein d3 is an arc length of the second surface 202 of the curved panel 20 between the light-emitting point P of the light source 221 and a normal OC1, and d2 is an arc length of the second surface 202 of the curved panel 20 between the light-emitting point P of the light source 221 and a normal OC2. Therefore, a ratio of a distance between two adjacent concave lines in the image captured by the photoelectric sensing module 23 to the actual distance between two adjacent concave lines, that is, the imaging ratio of the curved panel 20 to the fingerprint, is $k=(2d2-2d3)/d1=2r/(r-h)$.

In some embodiments, the scaling factor of the fingerprint image captured by the photoelectric sensing module 13 is $k>2$. That is to say, the captured image is a magnified image of the fingerprint.

When the curvature radius r of the curved panel 20 approaches positive infinity, that is, when the curved panel 10 is a flat panel, the imaging ratio is equal to two.

It should be noted that, in the method for determining the imaging ratio of the curved panel of embodiments shown in FIG. 3 and FIG. 4, the thickness of the photoelectric sensing module is neglected. In most cases, the thickness of the curved panel is much larger than that of the photoelectric sensing module. When the thickness of the photoelectric sensing module is not negligible, the thickness of the photoelectric sensing module needs to be considered when determining the imaging ratio of the curved panel.

Embodiments of the present disclosure provide a non-transitory storage medium, wherein the non-transitory storage medium stores computer programs. Once the computer programs are executed by a process, the method for determining an imaging ratio of a curved panel is performed.

In some embodiments, the memory further stores the thickness and the curvature radius of each point or each region of the curved panel.

Figure 5:
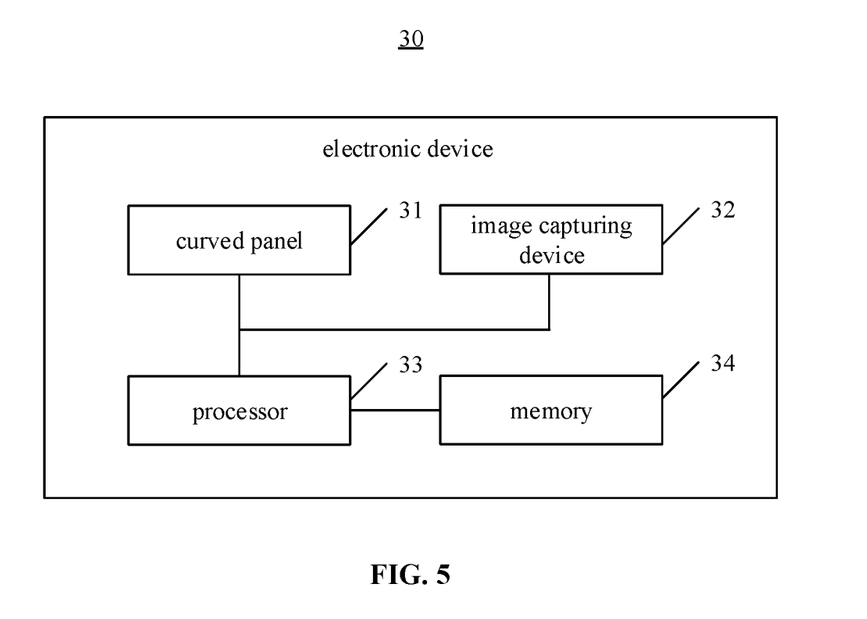
FIG. 5 schematically illustrates a structural diagram of an electronic device 30 according to an embodiment of the present disclosure.

Embodiments of the present disclosure provide an electronic device. Referring to FIG. 5, FIG. 5 schematically illustrates a structural diagram of an electronic device 30 according to an embodiment of the present disclosure.

In some embodiments, the electronic device 30 may include a curved panel 31, an image capturing device 32, a processor 33, and a memory 34. A first surface of the curved panel 31 is configured to be placed with a to-be-imaged object, and the image capturing device 32 is disposed on a second surface of the curved panel 31, wherein the image capturing device 32 is configured to receive an image of the to-be-imaged object imaged by the curved panel 31. The processor 33 is coupled with the curved panel 31 and the image capturing device 32. For example, the processor 33 has data communication ports coupled with the curved panel 31 and the image capturing device 32 respectively. The memory 34 stores computer programs, wherein once the computer programs are executed by the processor 33, the method for determining the imaging ratio of the curved panel is performed.

In some embodiments, the electronic device 30 may have the in-display or under-display fingerprint recognition function, and the curved panel 31 may include: a light-transmissive cover plate having a first surface configured for the fingerprint contact; and a display panel, with a first surface configured with the light-transmissive cover plate thereon and the second surface configured with the photoelectric sensing module 32 thereon, wherein a plurality of display pixels are disposed close to the second surface and inside the display panel, and the light source includes one display pixel or multiple display pixels. Specifically, the image capturing device 32 may be a photoelectric sensing module. The curved panel 31 may perform an imaging based on a total reflection principle of physical optics. For structures and functions of the light-transmissive cover plate, the display panel, and the photoelectric sensor, reference may be made to the embodiments shown in FIGS. 3 and 4, and details are not described herein again.

In some embodiments, the memory 34 is further configured to store the thickness and curvature radius on the curved panel 31 at each point or each region. When the computer program is executed by the processor 33 to determine the imaging ratio of the curved panel in embodiments of the present disclosure, a fingerprint pressing region on the first surface of the curved panel 31 may be determined first, and then the thickness and the curvature radius of the curved panel in the determined fingerprint pressing region stored in a memory 34 are directly called.

In some embodiments, when the computer program is executed by a processor, the computer program is further configured to correct an image captured by the image capturing device 32 according to the determined imaging ratio of the curved panel, thereby capturing an image that is close to an actual size of the to-be-imaged object.

In some embodiments, the electronic device 30 is made of a flexible material and configured to be worn on a wrist or other parts of a body other than the wrist. The electronic device may include a mobile phone, a smart bracelet, or a wristwatch, which adds application scenarios of the electronic device 30.

In conclusion, in embodiments of the disclosure, the method for determining the imaging ratio of the curved panel can calculate the imaging ratio of the curved panel for the to-be-imaged object according to the curvature radius and the thickness of the curved panel, so as to correct the captured image according to the imaging ratio, thereby capturing an image that is close to an actual size of the to-be-imaged object Further, the curved panel may include heterogeneous thicknesses and curvature radii. The method further includes: dividing the first surface of the curved panel into a plurality of regions to obtain thicknesses and curvature radii of each region of the curved panel; and determining a region where the to-be-imaged object locates on. Therefore, the imaging ratio of the curved panel for the to-be-imaged object can be calculated according to the curvature radius and the thickness of the curved panel in the determined region, and the accuracy of the calculation result is improved.

Further, the curved panel can perform an imaging based on a total reflection principle of physical optics. According to different bending directions of the curved panel, different calculation methods can be applied to calculate the imaging ratio of the curved panel. Specifically, when the curved panel is applied to the in-display or under-display fingerprint recognition, if the finger is in contact with the convex surface of the curved panel, the imaging ratio of the curved panel may be calculated according to k=2(r−h)/r, the imaging ratio may be greater than 1 (i.e., a magnified image), or may be less than 1 (i.e., a reduced image); if the finger is in contact with the concave surface of the curved panel, the imaging ratio of the curved panel may be calculated according to k=2r/(r−h), wherein the imaging ratio is greater than 2 (i.e., a magnified image).

In embodiments of the present disclosure, the electronic device includes a curved panel, an image capturing device, a memory, and a processor. When the computer program stored in the memory is executed by the processor, the method for determining an imaging ratio of a curved panel is performed. Therefore, while the electronic device uses a curved panel to improve the user experience of electronic products, it can also correct the captured image according to the determined imaging ratio of the curved panel, thereby capturing an image that is close to an actual size of the to-be-imaged object.

Although the present disclosure has been disclosed above with reference to preferred embodiments thereof, it should be understood that the disclosure is presented by way of example only, and not limitation. Those skilled in the art may modify and vary the embodiments without departing from the spirit and scope of the present disclosure.

What is claimed is:

1. A method for determining an imaging ratio of a curved panel, wherein a first surface of the curved panel is placed with a to-be-imaged object thereon, an image capturing device is disposed on a second surface opposite to the first surface in a thickness direction of the curved panel, the image capturing device is configured to capture an image of the to-be-imaged object being imaged by the curved panel, and the method comprises:
   obtaining a thickness of the curved panel and a curvature radius of the first surface of the curved panel; and
   calculating the imaging ratio of the curved panel for the to-be-imaged object according to the obtained thickness and curvature radius.

2. The method according to claim 1, wherein the first surface of the curved panel is configured for a finger contact, and a photoelectric sensing module is disposed on the second surface of the curved panel; and
   a light source is disposed close to the second surface inside the curved panel, wherein the light source is configured to emit light signals toward different directions of the first surface of the curved panel, the light signals are reflected on the first surface of the curved panel to form reflection light in different directions, and the reflection light passes through the curved panel and enters the photoelectric sensing module.

3. The method according to claim 2, wherein the first surface of the curved panel is a convex surface, and the second surface of the curved panel is a concave surface, and calculating the imaging ratio of the curved panel for the to-be-imaged object according to the obtained thickness and curvature radius comprises:
   calculating the imaging ratio of the curved panel according to k=2(r−h)/r, wherein k is a scaling factor of a fingerprint image captured by the photoelectric sensing module with respect to an original fingerprint, r is a curvature radius of the first surface of the curved panel in a region where the fingerprint locates, h is a thickness of the curved panel in the region where the fingerprint locates, wherein k, r, h are all non-negative numbers.

4. The method according to claim 3, wherein the scaling factor of the fingerprint image captured by the photoelectric sensing module with respect to the original fingerprint is 0<k<2.

5. The method according to claim 2, wherein the first surface of the curved panel is a concave surface, and the second surface of the curved panel is a convex surface, and calculating the imaging ratio of the curved panel for the to-be-imaged object according to the obtained thickness and curvature radius comprises:
   calculating an imaging ratio of the curved panel according to k=2r/(r−h), wherein k is a scaling factor of a fingerprint image captured by the photoelectric sensing module with respect to an original fingerprint, r is a curvature radius of the first surface of the curved panel in a region where the fingerprint locates, h is a thickness of the curved panel in the region where the fingerprint locates, wherein k, r, h are all non-negative numbers.

6. The method according to claim 5, wherein the scaling factor of the fingerprint image captured by the photoelectric sensing module with respect to the original fingerprint is 0<k<2.

7. The method according to claim 2, wherein the curved panel comprises:
   a light-transmissive cover plate, comprising the first surface configured for the finger contact; and
   a display panel, with a first surface configured with the light-transmissive cover plate thereon and the second surface configured with the photoelectric sensing module thereon, wherein a plurality of display pixels are disposed close to the second surface and inside the display panel, and the light source comprises one display pixel or multiple display pixels.

8. A non-transitory storage medium, storing computer programs, wherein once the computer programs are executed by a process, the method for determining an imaging ratio of a curved panel according to claim 1 is performed.

9. An electronic device comprising the curved panel, the image capturing device, a memory having computer programs stored therein, and a processor configured to execute the computer programs stored in the memory such that the electronic device is configured to perform the method for determining the imaging ratio of the curved panel according to claim 1;
   wherein the processor is coupled with the curved panel and the image capturing device.

10. The electronic device according to claim 9, wherein when the processor executes the computer programs stored in the memory, the electronic device is configured to further perform a method for correcting an image captured by the image capturing device according to the imaging ratio of the curved panel.

11. The electronic device according to claim 9, wherein the memory further stores a thickness and a curvature radius of the curved panel.

12. The electronic device according to claim 9, wherein the electronic device is made of a flexible material and suitable to be worn on a wrist or other parts of a body.

13. The electronic device according to claim 9, wherein the electronic device comprises a mobile phone, a smart bracelet, or a wristwatch.

14. A method for determining an imaging ratio of a curved panel, wherein a first surface of the curved panel is placed with a to-be-imaged object thereon, an image capturing device is disposed on a second surface opposite to the first surface in a thickness direction of the curved panel, the image capturing device is configured to capture an image of the to-be-imaged object being imaged by the curved panel, and the method comprises:
dividing the first surface of the curved panel into a plurality of regions;
determining a region where the to-be-imaged object locates on the first surface of the curved panel, and obtaining a thickness and a curvature radius of the curved panel in the region; and
calculating the imaging ratio of the curved panel for the to-be-imaged object according to the obtained thickness and curvature radius.

15. The method according to claim 14, wherein the first surface of the curved panel is configured for a finger contact, and a photoelectric sensing module is disposed on the second surface of the curved panel; and
a light source is disposed close to the second surface inside the curved panel, wherein the light source is configured to emit light signals toward different directions of the first surface of the curved panel, the light signals are reflected on the first surface of the curved panel to form reflection light in different directions, and the reflection light passes through the curved panel and enters the photoelectric sensing module.

16. The method according to claim 15, wherein the first surface of the curved panel is a convex surface, and the second surface of the curved panel is a concave surface, and calculating the imaging ratio of the curved panel for the to-be-imaged object according to the obtained thickness and curvature radius comprises:
calculating the imaging ratio of the curved panel according to $k=2(r-h)/r$, wherein k is a scaling factor of a fingerprint image captured by the photoelectric sensing module with respect to an original fingerprint, r is a curvature radius of the first surface of the curved panel in a region where the fingerprint locates, h is a thickness of the curved panel in the region where the fingerprint locates, wherein k, r, h are all non-negative numbers.

17. The method according to claim 16, wherein the scaling factor of the fingerprint image captured by the photoelectric sensing module with respect to the original fingerprint is $0<k<2$.

18. The method according to claim 15, wherein the first surface of the curved panel is a concave surface, and the second surface of the curved panel is a convex surface, and calculating the imaging ratio of the curved panel for the to-be-imaged object according to the obtained thickness and curvature radius comprises:
calculating an imaging ratio of the curved panel according to $k=2r/(r-h)$, wherein k is a scaling factor of a fingerprint image captured by the photoelectric sensing module with respect to an original fingerprint, r is a curvature radius of the first surface of the curved panel in a region where the fingerprint locates, h is a thickness of the curved panel in the region where the fingerprint locates, wherein k, r, h are all non-negative numbers.

19. The method according to claim 18, wherein the scaling factor of the fingerprint image captured by the photoelectric sensing module with respect to the original fingerprint is $0<k<2$.

20. The method according to claim 15, wherein the curved panel comprises:
a light-transmissive cover plate, comprising the first surface configured for the finger contact; and
a display panel, having a first surface and the second surface, wherein the light-transmissive cover plate is disposed on the first surface, the photoelectric sensing module is disposed on the second surface, a plurality of display pixels are disposed close to the second surface and inside the display panel, and the light source comprises one display pixel or multiple display pixels.

* * * * *